F. LORENZ.
INSTRUMENT FOR TESTING THE EYES.
APPLICATION FILED AUG. 8, 1912.

1,066,026. Patented July 1, 1913.

WITNESSES:
Wm. Harold Eichelman.
M. A. Milord.

INVENTOR:
FRANZ LORENZ.
By Benj. T. Roodhouse
ATTY.

COLUMBIA PLANOGRAPH CO., WASHINGTON, D. C.

UNITED STATES PATENT OFFICE.

FRANZ LORENZ, OF CHICAGO, ILLINOIS, ASSIGNOR TO F. A. HARDY & COMPANY, OF CHICAGO, ILLINOIS, A CORPORATION OF ILLINOIS.

INSTRUMENT FOR TESTING THE EYES.

1,066,026. Specification of Letters Patent. Patented July 1, 1913.

Application filed August 8, 1912. Serial No. 713,994.

*To all whom it may concern:*

Be it known that I, Franz Lorenz, a citizen of the United States, and a resident of Chicago, in the county of Cook and State of Illinois, have invented a new and useful Instrument for Testing the Eyes, of which the following is a specification.

The object of my invention is to provide in a handy and compact form, which will obviate the necessity of the comparatively extensive dark operating or testing room, an instrument for testing the eyes with which the tests may be made by a subdued source of illumination.

I attain the above objects by means of the mechanism illustrated in the accompanying drawing, in which:—

Figure 1:
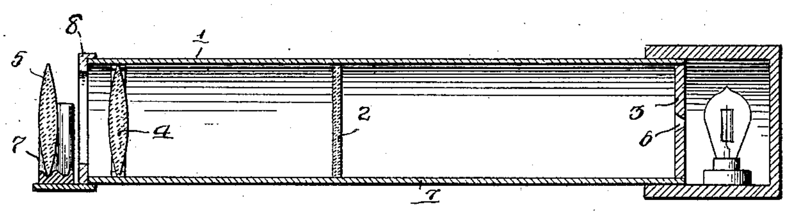
Figure 2:
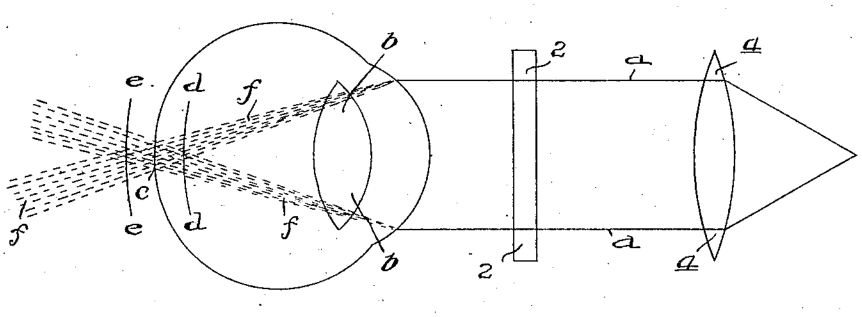

Figure 1 is a longitudinal central section of an embodiment of my invention, and Fig. 2 is a diagrammatic section through the optical axis of the instrument, and a schematic eye in position for testing.

Similar reference characters refer to similar parts throughout the several views.

It is well known that when the eye is directed to an intense source of illumination the iris is contracted to exclude the light. The contraction of the iris ( a muscular effort) is accompanied by a movement of the closely related ciliary muscles which control the crystalline lens, thereby changing the refraction of the eye from what it would be in a condition of rest. As a result, tests made with an intense or bright source of illumination fail to disclose the refraction of the eye when in a state of rest, and, thereby, fail to afford the data for ascertaining what, if any, correction would be desirable.

It is known that light waves of so called different length, imparting, when seen impressions of different color, are refracted unequally, the so called faster waves, that is the violet and blue, being bent to a greater extent or at a greater angle than are the so called slower waves which create the impression of yellow and red. In comparatively weak lenses this separation of the colors is negligible in the plane of focus, but in planes anterior to the plane of focus where the light is obviously diffused, the blue waves, being bent to a greater degree, will preponderate in a space or circle within the red rays; while in a plane posterior to the plane of focus, when diffusion is again occurring by reason of the divergence of rays which have been focused, the blue rays being most strongly bent will be diverged farther thereby producing a central area in which the red rays preponderate surrounded by an area in which the blue rays preponderate. With a source of illumination which is intense and consists of rays of many colors this phenomenon is obscured both by the presence of a number of colors and by the effort of the eye to focus the light, but when the illumination is subdued, and the colors of the illumination consist of but substantially two relatively widely separated primary spectrum colors, the eye makes no effort at focalization and the colors contrasting they can be easily distinguished when separated and condensed in different areas.

In order to utilize the above phenomenon for testing the refraction of the eye, my invention consists essentially of a tube, 1, for excluding all but the desired illumination; a screen, 2, of suitable shade and density for transmitting only the desired degree of illumination of but substantially two colors of a suitable difference of refraction; a stop or diaphragm, 3, for securing a suitable extent of the source of illumination; a lens, 4, for rendering the rays entering the eye parallel; and means, 5, for modifying the direction or focalization of the rays entering the eye to different known extents.

The length and size of the tube, 1, are determined by considerations of convenience. I have found that a tube of thirteen inches is convenient. With a tube of such a length a diaphragm having an aperture, 6, of one and a half mm. diameter produces an area of illumination of an extremely convenient size. Such a diaphragm aperture would occupy the same angle of vision, and at that distance produce an illuminated area of the same extent upon the retina as would an aperture of 25 mm., or substantially an inch diameter, located at twenty feet, the distance usually employed in testing the eyes.

The lens, 4, is located in the tube between the source of illumination and the eye, and the distance of its principal focus from the source of illumination, so that rays emerging from the lens will be parallel as they proceed toward the eye.

I have found that the screen, 2, may be made from cobalt blue glass, but a good deal of care should be bestowed upon its selection to get a screen of a suitable density so as to properly subdue the illumination, and to get a color comprising elementary rays of a distinctly different degree of refraction, such as blue and red which together make a purplish shade.

Upon the eye end of the tube is provided a cell 7, for holding test lenses, 5, of known powers of refraction. The test cell, 7, is secured in any suitable manner to the collar, 8, upon the eye end of the tube, 1.

In the diagrammatic figure the combined rays proceeding toward the eye are designated by the letter *a*, the crystalline lens of the eye by *b*, the plane of the focus of the crystalline lens by *c*, a plane anterior thereto by *d*, and a plane posterior thereto by *e;* while the separated colors are shown by dotted lines *f*. In the plane, *c*, of the focus of the crystalline lens, *b*, the diffusion being extremely slight, the source of illumination is seen of a homogeneous purplish color. In a plane anterior thereto, *d*, the colors being diffused or broken up the source of illumination is seen with a blue center and red border, and in a plane posterior to the plane of the focus, *e*, the rays being again diffused, but this time by divergence after instead of convergence before focalization, the source of illumination is seen with a red center and blue border.

If an emmetropic or normal eye is placed to receive the parallel rays from the lens, 4, it will focalize them upon the retina. In a case of myopia the retina is posterior to the plane of the focus of the crystalline lens or the eye is too long and the illumination would be seen with a red center and blue border; while with a case of hypermotropia the retina is anterior to the plane of the focus of the crystalline lens, or the eye is too short, and the source of illumination would be seen with a blue center and red border.

It will now be seen that by looking into the instrument the normality or abnormality of the eye will be at once disclosed, and, in case of any abnormality, the interposition of different test lenses, 5, of known value, in the cell, 7, until a normal appearance of the source of illumination is obtained will disclose the amount of the abnormality.

There are already upon the market many instruments for testing the eyes comprising tubes which exclude the light except from a single source of illumination to which the necessary elements to form my present invention could be easily added in the way of attachments. Such arrangements might vary somewhat in detail from the form herein shown and described without in any manner departing from the spirit or manner of operation of my invention. For instance, it is immaterial whether the screen, 2, be placed adjacent the source of illumination or at the eye end of the tube, or in fact it may be placed anywhere in the system, the form and details of construction of the tube may be considerably varied, and any suitable arrangement of means for modifying the refraction of the eye, instead of the arrangement for test lenses as shown, might be employed.

Having thus described my invention what I claim as new and desire to secure by Letters Patent, is:—

1. An instrument for testing the eyes comprising a tube having an aperture therein, a lens for paralleling rays of light admitted through said aperture, a sight aperture alining with said first mentioned aperture, a color screen the color whereof comprises a large preponderance of but two spectrum shades having a relatively large refractive difference, and means for focalizing the light to different known extents.

2. An instrument for testing the eyes comprising a compartment having an aperture for the admission of light thereto, and an aperture in the path of the admitted light through which it may be seen, a color screen disposed in the path of the light of a color comprising a preponderance of two primary spectrum colors, means for modifying the focalization of light passing through said compartment to known extents, and a diaphragm for controlling the cross-sectional area of the path of said light.

3. An instrument for testing the eyes comprising a tube, a diaphragm having an aperture therein for controlling the area through which illumination is admitted to said tube, a lens for paralleling the rays admitted through said aperture, a color screen having a large preponderance of two primary spectrum colors of different degrees of refraction, a sight aperture alining with said diaphragm aperture, and means for modifying the focalization of light passing through said tube to different known extents.

In testimony whereof I affix my signature in the presence of two witnesses.

FRANZ LORENZ.

Witnesses:
BENJ. T. ROODHOUSE,
HATTIE B. LEHMAN.

Copies of this patent may be obtained for five cents each, by addressing the "Commissioner of Patents, Washington, D. C."